United States Patent Office.

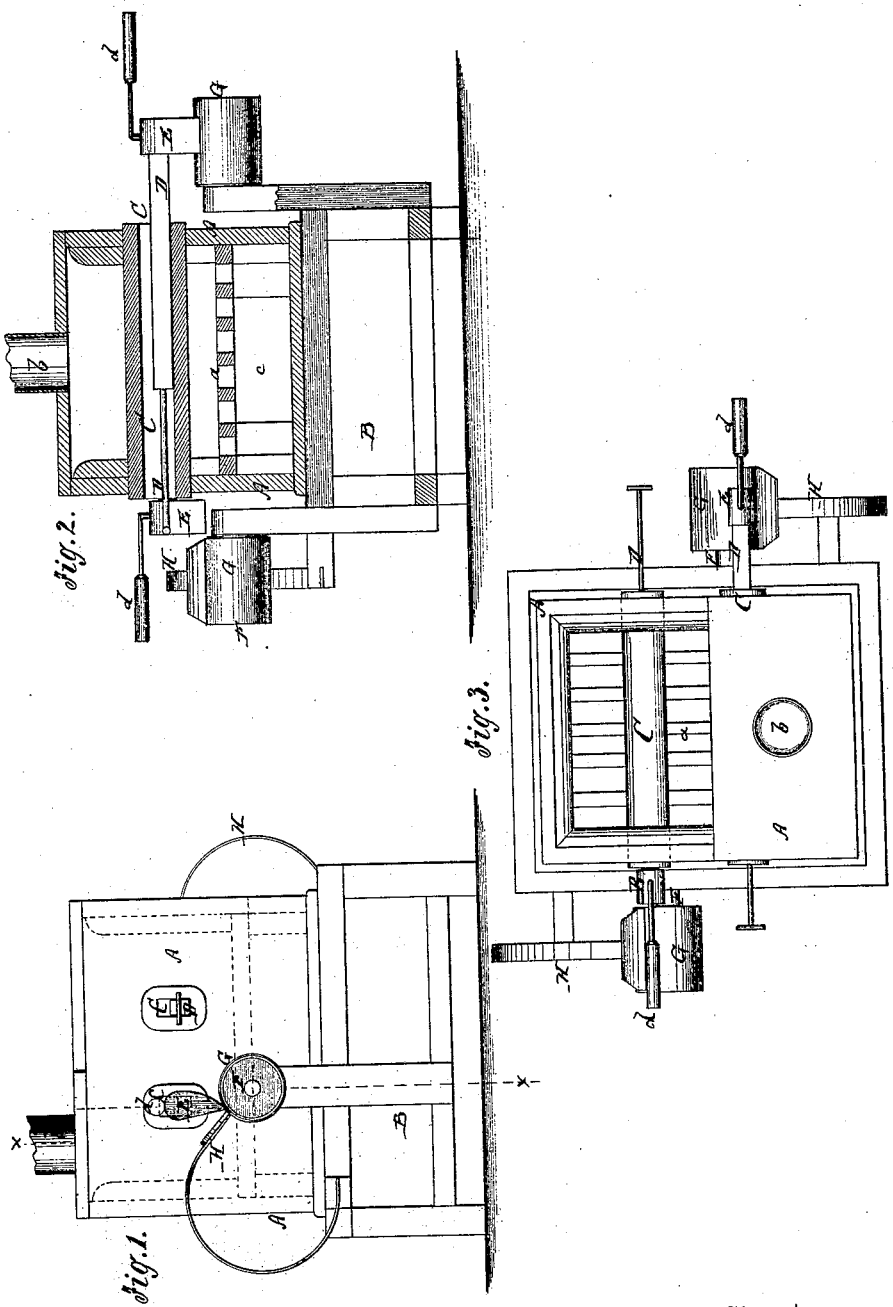

JACOB GULDEN, OF KEY PORT, NEW JERSEY.

Letters Patent No. 103,603, dated May 31, 1870.

IMPROVEMENT IN SOLDERING APPARATUS.

The Schedule referred to in these Letters Patent and making part of the same.

*To all whom it may concern:*

Be it known that I, JACOB GULDEN, of Key Port, in the county of Monmouth and State of New Jersey, have invented a new and Improved Can-soldering Apparatus; and I do hereby declare that the following is a full, clear, and exact description thereof, which will enable others skilled in the art to make and use the same, reference being had to the accompanying drawings forming part of this specification, in which—

Figure 1 represents a side elevation of my improved can-soldering apparatus.

Figure 2 is a vertical transverse section of the same, taken on the plane of the line x x, fig. 1.

Figure 3 is a plan or top view of the same.

Similar letters of reference indicate corresponding parts.

This invention relates to a new apparatus for soldering the seams of sheet-metal cans, and consists in the use of a tubular furnace, which is combined with sliding soldering-irons that work in the tubes for the purpose of being heated therein.

The invention consists, also, in the application to the apparatus, of a set of springs for holding the cans on the blocks that are prepared for them on the sides of the furnace.

A, in the drawing, represents a furnace of rectangular or other suitable form, supported on a frame, B, of suitable description.

The furnace contains a grate, *a*, smoke-pipe *b*, and fire-door *c*, in the ordinary manner.

Through the furnace are fitted two, more or less, transverse pipes C C, which are arranged above the fire-place, to be surrounded and thoroughly heated by the flames.

Through one open end of each pipe C, is inserted within the same a sliding bar, D, made of metal.

The outer end of each bar D carries a soldering-iron, E, and the handle *d* for operating the same.

The heated pipes C serve to heat the bars D, and thereby the irons E.

F F are blocks secured to the sides of the furnace, one under each iron E. These blocks are so shaped as to conform to the shape of the cans to be soldered, which may be of cylindrical, prismatic, or other suitable form.

The can G is slipped upon the block F, so that its long seam will be under the iron E. The seam before soldering is held closed by means of a spring, H, which is secured to the side of the furnace, as shown in fig. 1. The solder is then applied to, and the iron E moved along the seam.

It will be seen that by this construction of apparatus the soldering process can be carried on on each side of the furnace, and that, therefore, the heat of the furnace can be utilized for a suitable number of soldering-blocks.

Having thus described my invention,

I claim as new, and desire to secure by Letters Patent—

1. The furnace A, provided with the open ended tubes C, for receiving the reciprocating-shanks D of the soldering irons, as set forth.

2. The springs H, combined with the blocks F, for the purpose of holding the can in position for soldering, as set forth.

JACOB GULDEN.

Witnesses:
GEO. W. MABEE,
ALEX. F. ROBERTS.